Aug. 27, 1957
H. T. MORTIMER
2,804,547
D.C. TO A. C. CONVERTER
Filed July 27, 1956
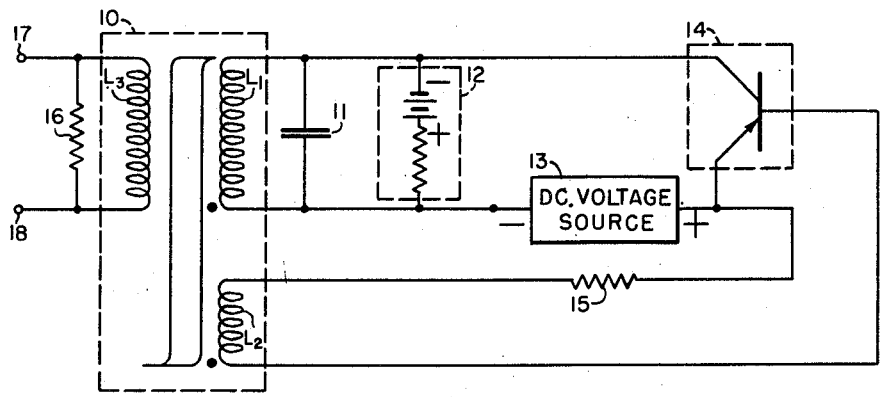
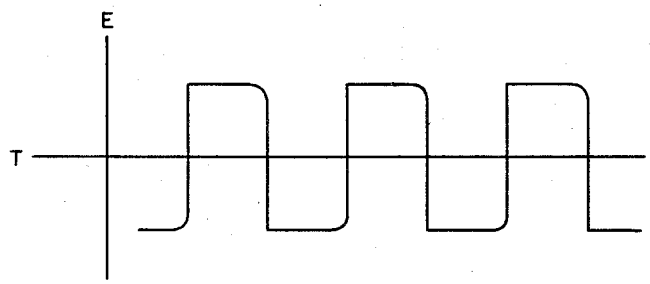
INVENTOR
HARRY T. MORTIMER
BY *WR Maltby*
*Richard C Reed*
ATTORNEYS United States Patent Office 2,804,547
Patented Aug. 27, 1957

2,804,547

D. C. TO A. C. CONVERTER

Harry T. Mortimer, Los Angeles, Calif.

Application July 27, 1956, Serial No. 600,637

6 Claims. (Cl. 250—36)

(Granted under Title 35, U. S. Code (1952), sec. 266)

The invention described herein may be manufactured and used by or for the Government of the United States of America for governmental purposes without the payment of any royalties thereon or therefor.

This invention relates in general to devices for converting a D. C. voltage into an A. C. voltage and in particular to a magnetic square wave converter.

A wide variety of mechanical, electromechanical and electrical devices, which make use of principles well known in the art, are available for converting a D. C. voltage into an A. C. voltage. However, as reliability, size and weight become increasingly important considerations in modern applications, such as high altitude rocket design, for example, the great majority of these prior art devices are not suitable. It will be appreciated that a compact and reliable D. C. to A. C. converter is needed and would be welcomed as a highly desirable advancement of the art.

Accordingly:

It is an object of this invention to provide a lightweight magnetic D. C. to A. C. converter utilizing a minimum number of component parts.

It is another object of this invention to provide a compact D. C. to A. C. converter which produces a stable frequency output.

It is an additional object of this invention to provide an imediately responsive D. C. to A. C. converter involving no significant warm-up time delay.

Other objects of the invention will become apparent upon a more comprehensive understanding of the invention for which reference is had to the following specification and the drawings.

In the drawings:

Fig. 1 is a schematic showing of a preferred embodiment of the invention.

Fig. 2 is a graphical showing of a typical output voltage waveform for the embodiment of Fig. 1.

A rectangle is drawn between the transformer windings in Fig. 1 to indicate a core material having a substantially rectangular hysteresis characteristic.

Briefly, the device of this invention incorporates a transformer of the type generally employed in magnetic amplifiers, an on-off transistorized switching means, a constant current source, a charging capacitor and a D. C. voltage source, in a magnetic oscillator circuitry. An automatic switching arrangement is employed wherein a positive switching action is obtained by a core material saturation condition sensitive control means. The device will produce a constant frequency square wave output.

An exemplary and preferred embodiment of the invention which is demonstrative of the basis principle of operation of the invention is shown in Fig. 1. In this embodiment a magnetic core material having a substantially rectangular hysteresis loop characteristic is utilized for the transformer 10. Transformer 10 comprises three windings $L_1$, $L_2$ and $L_3$, with the windings $L_1$ and $L_2$ having the dot indicated winding sense or polarity relationship.

In the exemplary embodiment shown in the drawing, a capacitor 11, a constant current source 12, plus a serially connected D. C. voltage source 13 and switching means 14 are connected in parallel across the excitation winding $L_1$.

In this particular embodiment, a PNP type junction transistor is shown as the switching means 14. For reasons which will become apparent hereinafter, the transistor collector terminal is connected to the undotted end of the winding $L_1$, the emitter terminal is connected to the positive terminal of the D. C. voltage source 13, and the base winding $L_2$ is connected via the current limiting impedance 15 across the base and emitter terminals of the transistor.

An impedance 16 is connected directly across the output terminals 17 and 18 of the winding $L_3$ as a dissipative load impedance.

For purposes of analysis, the full operational cycle of the device of this invention is divisible into half cycle modes with automatic switching between modes.

In the first half cycle mode the switching means 14 is closed. Under this condition, the constant current source 12 effectively ignores the relatively high impedance path via the winding $L_1$ and current flows from the positive terminal of the current source through the serially connected voltage source 13 and the switching means 14 back to the negative terminal thereof. At the same time current from the D. C. voltage source 13 flows through the switching means and into the winding $L_1$ in such a direction as to send the core material toward positive saturation, in this instance, into the undotted end of the winding. Thus it will be seen that it is important to this invention that the D. C. voltage source 13 be capable of providing a current of sufficient magnitude to carry the core material from one saturation level to the other in one half cycle. That is, the period of one half cycle times the magnitude of the output of voltage source 13 must be at least equal to the volt second constant for the particular core material.

As current flows in the winding $L_1$ a voltage is induced in the winding $L_2$. This induced voltage is applied across the base and emitter terminals of the transistor to control the switching operation thereof.

In brief explanation of the operation of PNP type junction transistors as a switching means, as the base is made more negative with respect to either emitter or collector, the transistor will conduct, that is, its emitter to collector impedance will be reduced. On the other hand if the base is made positive with respect to both emitter or collector, the transistor will block. During this first half cycle, the voltage induced in the winding $L_2$ is applied across the base and emitter to hold the base negative with respect to the emitter in order that the switching means will be in the conducting state.

As the core material continues to approach and finally reaches its positive saturation level the base of the transistor remains negatively polarized while the respective impedances of the windings $L_1$ and $L_2$ are reduced. As the impedance of the winding $L_1$ is reduced an increasing portion of the voltage output of source 13 is dropped across the transistor switching means 14 and less voltage is dropped across the winding $L_1$. Thus a lesser voltage is induced in the winding $L_2$ which reduces the magnitude of the potential across the emitter and base of the transistor. Consequently, the emitter to collector impedance of the transistor begins to increase and an avalanche effect is produced which rapidly decreases the current flowing through the winding $L_1$. This avalanche effect, of course, results in a collapse of the flux in the core material of transformer 10 which leaves the core material in a saturated remanence condition.

The voltage induced in the winding $L_2$ by this flux collapse thus applies a voltage of opposite polarity to that previously applied across the emitter-base terminals of the transistor 14 which brings the emitter to collector impedance to its highest value. With this flux collapse, the switching is completed and the second half cycle mode is begun.

Whereas, the magnetization current in the winding $L_1$ increases as the saturation level is approached, it will be seen that a large inductive kick is produced when the switching means 14 subsequently blocks. This inductive kick rapidly charges the capacitor 11 connected across the winding $L_1$ with a voltage of the same polarity as that of the constant current source 12. Thus at the beginning of the second half cycle mode, the capacitor 11 is charged with a relatively high voltage.

During the second mode of the operational cycle both the constant current source 12 and the charged capacitor 11 send current into the dotted end of the winding $L_1$ to carry the core material toward negative saturation.

For substantially square wave operation, the current capacity of the constant current source is greater than the initial magnetization current for the particular core. Thus for square wave operation, at the beginning of the second mode, the constant current source serves to supplement the charge on the capacitor as well as to provide all the current flowing through the winding $L_1$. As the core progresses toward negative saturation, the back E. M. F. is decreased so the magnetization current is increased and the full output of the constant current source is gradually applied to the winding. Finally, as the core nears its saturation level, the charged capacitor 11 begins to supply a portion of the saturating or reset current. Since the windings $L_1$ and $L_2$ are inductively coupled, a voltage is induced in the winding $L_2$ as the core material is being brought toward negative saturation. This induced voltage provides the transistor with a positive base circuit which holds the switching means in its blocked condition.

When the core material reaches its negative saturation level, the winding $L_1$ again exhibits its lowest impedance which permits a final discharge of the capacitor in a large current surge. Upon the final discharge of the capacitor, the saturation current decays and this decay provides the initial impulse which starts the transistor switching means toward its conducting state and the switching action previously described again occurs, this time to convert the switching means to full conduction.

With the transistor switching means conducting, the D. C. supply voltage 13 is again applied across the winding $L_1$ to bring the core material to its positive saturation level and the operation begins anew in cyclic fashion.

From the above analysis of the operational cycle, it will be seen that the period of the first half cycle is largely dependent upon the particular core material employed and the magnitude of the output of D. C. voltage source 13 and that the period of the second half cycle is largely dependent upon the particular core material, and the discharge rate of the capacitor 11 which is, of course, primarily controlled by the size of the capacitor and the output of the constant current source 12. It is readily apparent that by the selection of proper component values, the periods of the two half cycle modes may be equalized and a substantially perfect square wave output, such as shown in Fig. 2, may be obtained at lower frequencies. It has been found that preferably, the operating frequency should be in the power to low audio range. It is recognized, however, that the device of this invention is operable at higher frequencies, as well.

The embodiment of Fig. 1 has been constructed and tested utilizing a Deltamax 50018–1A transformer core material and a Hytron HD197 PNP type junction transistor. In this operating model the D. C. source 13 supplied 20 volts and the constant current source 12 comprised a 90 volt source with a 1000 ohm resistor in series therewith. The capacity of the capacitor 11 was 1.0 mfd. and the load impedance 16 measured 80 ohms. The windings $L_1$, $L_2$ and $L_3$ had 600, 60 and 600 turns, respectively. The values listed above are for a particular operating model of the invention with no specific application intended. Therefore, it is to be emphasized that these values are not necessarily those for optimum performance in every application of the device. More particularly, it is understood, that these component values are not to be considered as limiting the invention.

Furthermore, it is understood that any other type of switching means capable of performing the on-off function provided by the PNP type junction transistor might be substituted therefor without departing from the purview of this invention.

Finally, this invention is to be limited only by the scope of the claims appended hereto.

What is claimed is:

1. A D. C. to A. C. square wave converter comprising a plurality of mutually inductive windings wound on a core of a material having a substantially rectangular hysteresis characteristic; a D. C. voltage source and an on-off switching means for periodically interrupting current flow serially connected across a first winding in said plurality; a capacitive means connected across said first winding in parallel with said serial connection; a constant current source connected across said first winding in opposing polarity to said D. C. voltage source in said serial connection; the output current of said D. C. voltage source being sufficient to bring said core from one saturation level to the other during the period said switching means will conduct current; controlling means for controlling the operation of said switching means connected to a second winding of said plurality and operable in accordance with the polarity of the voltage induced in said second winding by the passage of current in said first winding; and output means connected across a winding of said plurality other than said first winding.

2. A D. C. to A. C. square wave converter comprising a plurality of mutually inductive windings wound on a core of a material having a substantially rectangular hysteresis characteristic; a D. C. voltage source; an on-off PNP type junction transistor switching means for periodically interrupting current flow, said transistor switching means having emitter, collector and base connections; said D. C. voltage source and the emitter-collector connections of said transistor being serially connected across a first winding in said plurality; a capacitive means connected across said first winding in parallel with said serial connection; a constant current source connected across said first winding in opposing polarity to said D. C. voltage source in said serial connection; the output current of said D. C. voltage source being sufficient to bring said core from one saturation level to the other during the period said switching means will conduct current; controlling means for controlling the operation of said switching means connected to a second winding of said plurality and operable in accordance with the polarity of the voltage induced in said second winding by the passage of current in said first winding; and output means connected across a winding of said plurality other than said first winding.

3. A D. C. to A. C. square wave converter comprising a plurality of mutually inductive windings wound on a core of a material having a substantially rectangular hysteresis characteristic; a D. C. voltage source and an on-off switching means for periodically interrupting current flow serially connected across a first winding in said plurality; a capacitive means connected across said first winding in parallel with said serial connection; polarized means for controlling the discharge rate of said capacitive means connected across said first winding in opposing polarity to said D. C. voltage source in said serial connection; the output current of said D. C. voltage source being sufficient to bring said core from one saturation level to the other during the period said switching means will conduct current; controlling means for controlling the operation of said switching means connected to a second winding of said plurality and operable in accordance with the polarity of the voltage induced in said second winding by the passage of current in said first winding; and output means connected across a winding of said plurality other than said first winding.

4. A D. C. to A. C. square wave converter comprising a plurality of mutually inductive windings wound on a core of a material having a substantially rectangular hysteresis characteristic; a D. C. voltage source; an on-off PNP type junction transistor switching means for periodically interrupting current flow, said transistor switching means having emitter, collector and base connections; said D. C. voltage source and the emitter-collector connections of said transistor being serially connected across a first winding in said plurality; a capacitive means connected across said first winding in parallel with said serial connection; polarized means for controlling the discharge rate of said capacitive means connected across said first winding in opposing polarity to said D. C. voltage source in said serial connection; the output current of said D. C. voltage source being sufficient to bring said core from one saturation level to the other during the period said switching means will conduct current; controlling means for controlling the operation of said switching means connected to a second winding of said plurality and operable in accordance with the polarity of the voltage induced in said second winding by the passage of current in said first winding; and output means connected across a winding of said plurality other than said first winding.

5. A D. C. to A. C. square wave converter comprising a plurality of mutually inductive windings wound on a core of a material having a substantially rectangular hysteresis characteristic; a D. C. voltage source and an on-off switching means for periodically interrupting current flow serially connected across a first winding in said plurality; a capacitive means connected across said first winding in parallel with said serial connection; a constant current source connected across said first winding in opposing polarity to said D. C. voltage source in said serial connection; the output current of said D. C. voltage source being sufficient to bring said core from one saturation level to the other during the period said switching means will conduct current; controlling means for controlling the operation of said switching means connected to a second winding of said plurality and operable in accordance with the polarity of the voltage induced in said second winding by the passage of current in said first winding; and output means connected across a third winding of said plurality.

6. A D. C. to A. C. square wave converter comprising a plurality of mutually inductive windings wound on a core of a material having a substantially rectangular hysteresis characteristic; a D. C. voltage source and an on-off switching means for periodically interrupting current flow serially connected across a first winding in said plurality; a capacitive means connected across said first winding in parallel with said serial connection; a constant current source connected across said first winding in opposing polarity to said D. C. voltage source in said serial connection; the output current of said constant current source being greater than the initial magnetization current of said first winding on said core; the output current of said D. C. voltage source being sufficient to bring said core from one saturation level to the other during the period said switching means will conduct current; controlling means for controlling the operation of said switching means connected to a second winding of said plurality and operable in accordance with the polarity of the voltage induced in said second winding by the passage of current in said first winding; and output means connected across a winding of said plurality other than said first winding.

No references cited.